(12) United States Patent
Aiba

(10) Patent No.: US 8,207,489 B2
(45) Date of Patent: Jun. 26, 2012

(54) IMAGING APPARATUS HAVING HEAT DISSIPATION STRUCTURE FOR IMAGE SENSOR

(75) Inventor: Koji Aiba, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 384 days.

(21) Appl. No.: 12/556,522

(22) Filed: Sep. 9, 2009

(65) Prior Publication Data

US 2010/0059664 A1    Mar. 11, 2010

(30) Foreign Application Priority Data

Sep. 11, 2008    (JP) ................. 2008-233542

(51) Int. Cl.
*H01J 5/02*    (2006.01)
*H04N 5/225*    (2006.01)

(52) U.S. Cl. .......... 250/239; 348/335; 348/373
(58) Field of Classification Search ............ 250/239; 348/335, 372, 374; 396/97, 268, 529
See application file for complete search history.

(56) References Cited

U.S. PATENT DOCUMENTS 4,769,711 A  *  9/1988  Date ..................... 348/374

FOREIGN PATENT DOCUMENTS

JP    2003-304420    10/2003

* cited by examiner

*Primary Examiner* — Thanh X Luu
(74) *Attorney, Agent, or Firm* — Canon USA Inc IP Division

(57) ABSTRACT

An imaging apparatus includes a lens barrel, an image sensor, an imaging plate configured to fix the image sensor thereto, an elastic member disposed between the lens barrel and the imaging plate, a fixing member configured to fix the imaging plate to the lens barrel while deforming the elastic member, a heat transfer plate which transfers heat from the imaging plate, and a heat-conductive sheet which is elastically deformable and held between the imaging plate and the heat transfer plate. When the imaging plate is fixed to the lens barrel, the heat-conductive sheet is held between the imaging plate and the heat transfer plate, such that a direction of an elastic force applied to the imaging plate by the elastic member coincides with a direction of an elastic force applied to the imaging plate by the heat-conductive sheet.

3 Claims, 7 Drawing Sheets

IMAGING APPARATUS HAVING HEAT DISSIPATION STRUCTURE FOR IMAGE SENSOR

BACKGROUND OF THE INVENTION

1. Field of the Invention

The present invention relates to an imaging apparatus as typified by a digital camera, and more particularly to an imaging apparatus characterized by its heat dissipation structure for cooling an image sensor.

2. Description of the Related Art

In recent years, imaging apparatuses using a solid-state image sensor, such as a charge coupled device (CCD) or complementary metal oxide semiconductor (CMOS), to convert an object image into an electric signal have become widespread. The solid-state image sensor generally includes semiconductors, thermal noise is generated in the image sensor. Moreover, elements mounted around the solid-state image sensor are affected by the generated head.

Because the thermal noise (also referred to as dark noise) increases monotonically with a rise in temperature of the image sensor, it is desirable to keep temperature of the image sensor at the lowest possible to reduce generation of the thermal noise and to capture an image with high image quality.

Therefore, some imaging apparatuses used for high-speed continuous shooting and for long exposure imaging in astrophotography are provided with a cooling mechanism for an image sensor to obtain images with high image quality.

Meanwhile, downsizing of digital cameras has been strongly demanded, and miniaturization of a camera body, as exemplified by downsizing and high density integration of an optical system and circuit elements, is steadily advanced while maintaining high functionality and performance.

However, the conventional cooling mechanism generally has a complicated structure which is one factor that makes miniaturization of digital cameras difficult.

To solve the above problem, Japanese Patent Application Laid Open No. 2003-304420 discusses a mechanism which has an elastic heat-conductive member disposed between an imaging plate and a display unit to dissipate heat.

When the image sensor is mounted on a lens barrel, if the image sensor, such as a CCD or CMOS sensor, is tilted, a problem arises in optical performance such that an image is in focus in some areas but out of focus in other areas around an optical axis.

Therefore, as shown in FIG. 8, an optical adjusting mechanism is provided to adjust the tilt or a position of an imaging plate 4' supported by urging springs 3' by tightening or loosening adjusting screws 2'.

At this time, if a stress of the heat-conductive member 5' is large, this stress hampers the correction of the tilt of the imaging plate 4' (more specifically, a stress in a "B" direction applied by the heat-conductive member 5' reduces urging effects of the urging springs 3' which applies a stress in an "A" direction.)

The present invention is directed to an imaging apparatus which can prevent a temperature rise in an image sensor and form a high quality image data showing less noise even in high-speed continuous shooting and long-time continuous exposure imaging without detracting from performance of a tilt adjusting mechanism.

SUMMARY OF THE INVENTION

According to an aspect of the present invention, an imaging apparatus includes a lens barrel, an image sensor, an imaging plate configured to fix the image sensor thereto, an elastic member disposed between the lens barrel and the imaging plate, a fixing member configured to fix the imaging plate to the lens barrel while deforming the elastic member, a heat transfer plate which transfers heat from the imaging plate, a heat-conductive sheet which is elastically deformable and held between the imaging plate and the heat transfer plate. When the imaging plate is fixed to the lens barrel, the heat-conductive sheet is held between the imaging plate and the heat transfer plate, such that a direction of an elastic force applied to the imaging plate by the elastic member coincides with a direction of an elastic force applied to the imaging plate by the heat-conductive sheet.

According to another aspect of the present invention, an imaging apparatus includes a lens barrel, an image sensor, an imaging plate configured to fix the image sensor thereto, a fixing member configured to fix the imaging plate to the lens barrel, a heat transfer plate which transfers the heat from the imaging plate, and a heat-conductive sheet which is elastically deformable and held between the imaging plate and the heat transfer plate. The heat-conductive sheet and the heat transfer plate are arranged between the lens barrel and the imaging plate, and the fixing member fixes the imaging plate to the lens barrel while elastically deforming the heat-conductive sheet.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
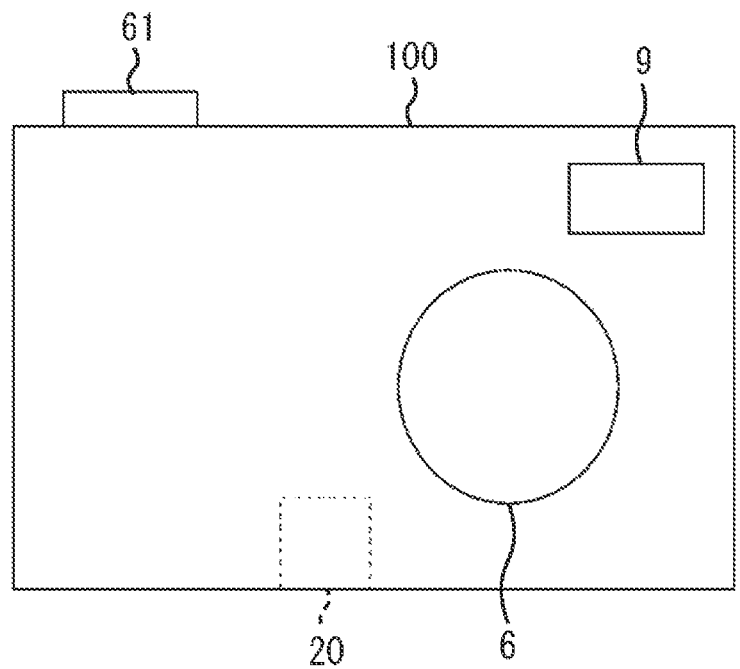
FIG. 1 is a front view of a digital camera as an imaging apparatus according to an exemplary embodiment of the present invention.
Figure 2:
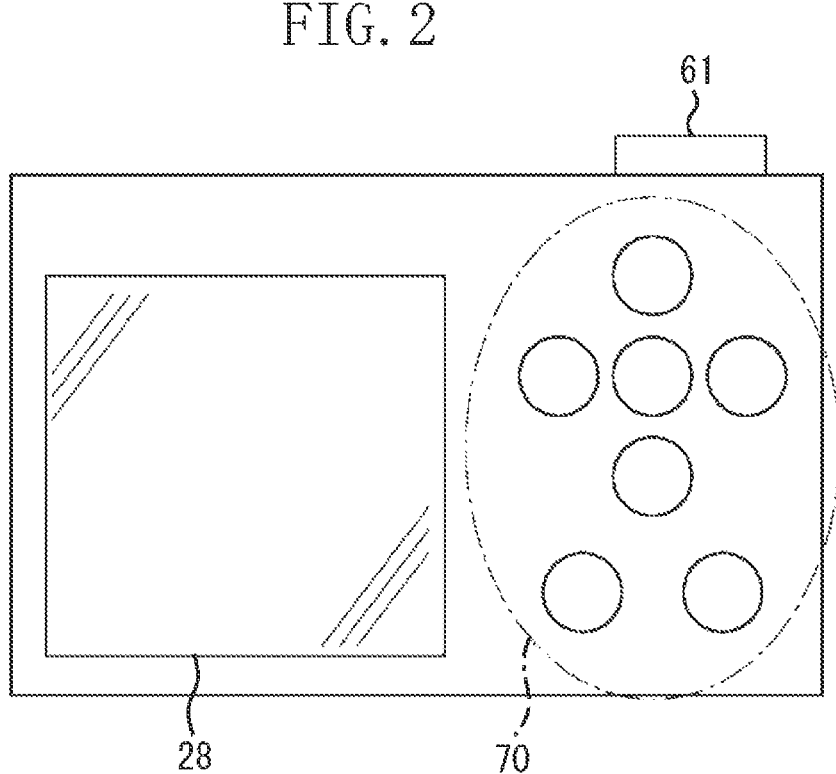
FIG. 2 is a rear view of the digital camera in FIG. 1.
Figure 3:
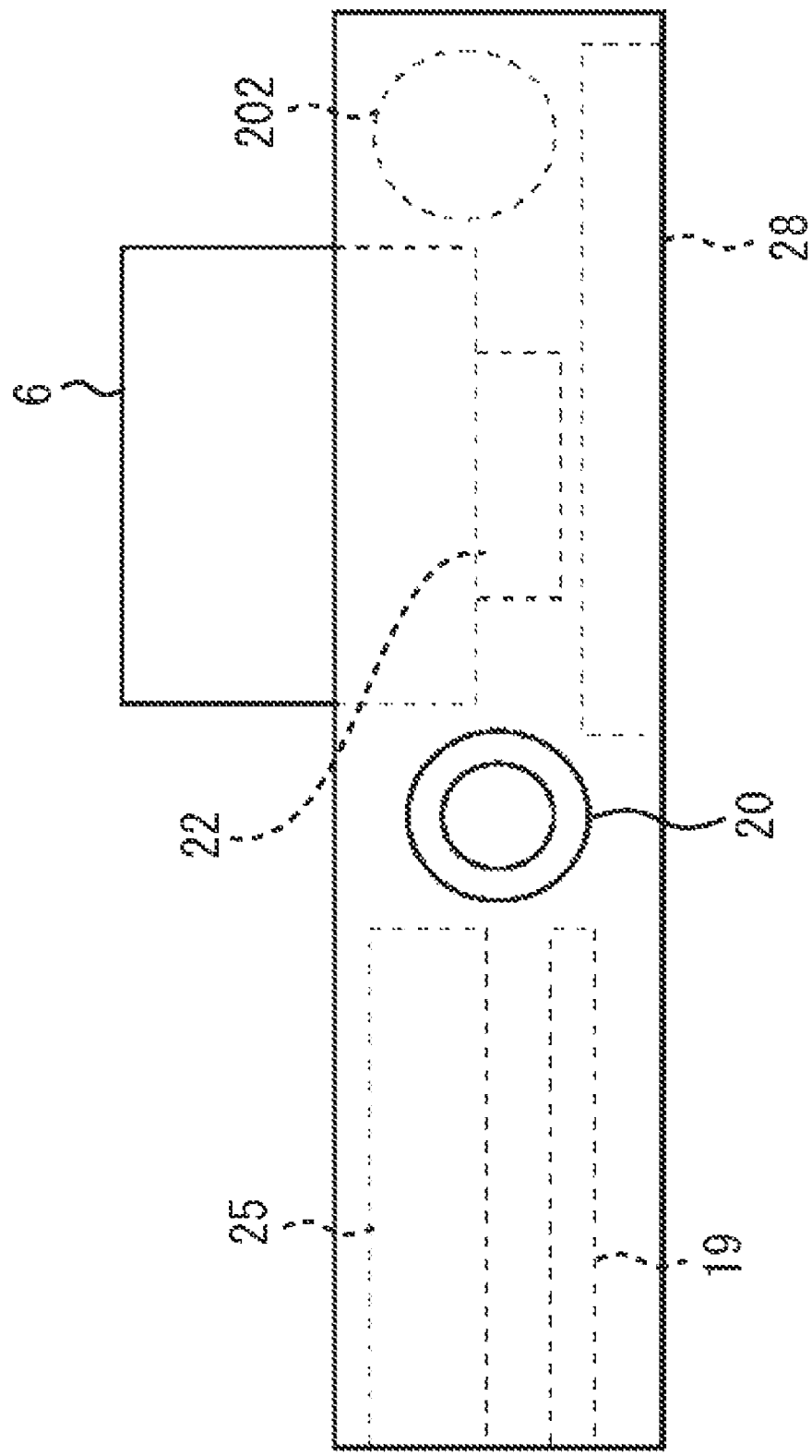
FIG. 3 is a bottom perspective view of the digital camera in FIG. 1.

FIG. 1 is a front view of a digital camera as an imaging apparatus according to an exemplary embodiment of the present invention. FIG. 2 is a rear view of the digital camera in FIG. 1. FIG. 3 is a bottom perspective view of the digital camera in FIG. 1.

Figure 4:
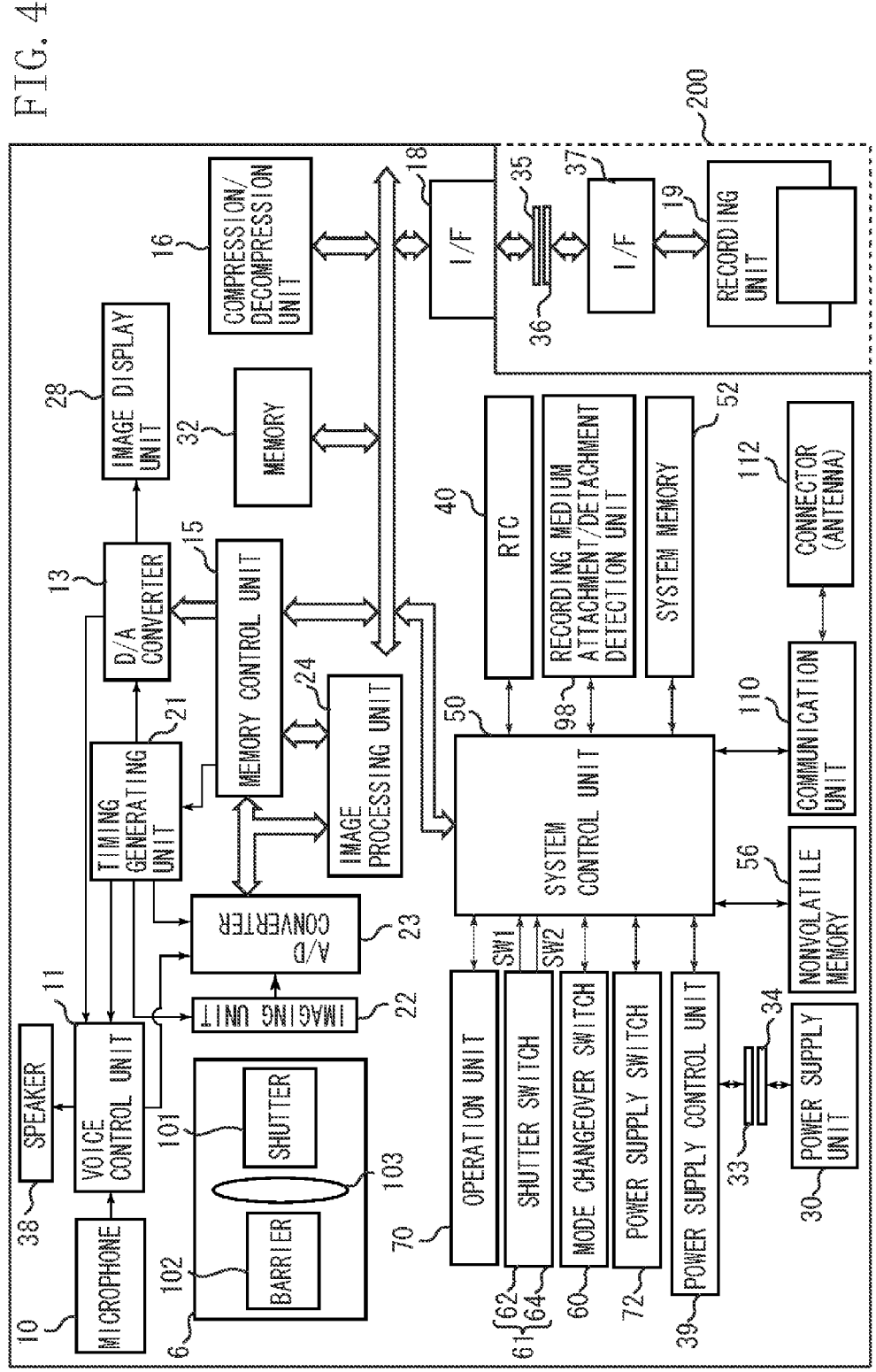
FIG. 4 is block diagram of the digital camera in FIG. 1.

As illustrated in FIG. 1, a lens barrel 6 is arranged on a slightly right from a center of a front of a casing of a digital camera 100, and the lens barrel 6 holds a photographic lens 103 illustrated in FIG. 4.

A shutter switch 61 is provided on top left of the casing of the digital camera 100, as viewed from the front of the casing. Further, a flash window 9 to emit flashlight which is used for night time shooting is provided on an upper and front portion of the casing.

A tripod screw 20 is provided on a center of a bottom of the casing of the digital camera 100. The tripod screw 20 is used to fix the digital camera 100. The tripod screw 20 which is required to have a sufficient mechanical strength is generally made of zinc die-cast or aluminum die-cast.

As illustrated in FIG. 2, an image display unit 28 formed of a liquid crystal display (LCD) and an operation unit 70 are provided on a rear side of the casing of the digital camera 100.

As illustrated in FIG. 3, a battery storage unit 25 configured to store batteries as a power supply to the digital camera 100 and a recording unit 19 configured to accommodate a memory card for recording a video signal, are provided on a left end of the casing of the digital camera 100.

A main capacitor 202 with large capacity which is used in a boost circuit to obtain a high voltage necessary for the flash operation in night time shooting is arranged on a right end of the casing of the digital camera 100.

An imaging unit 22 is arranged, in which the image sensor is mounted, such that a light-receiving surface thereof is placed in a position where an object image is focused by the photographic lens 103 held in the lens barrel 6.

FIG. 4 is a block diagram of the digital camera in FIG. 1.

The lens barrel 6 includes a shutter 101 with a diaphragm mechanism, a barrier 102 configured to cover the photographic lens 103 and the imaging unit 22 to protect the imaging unit 22 from being stained or damaged.

The imaging unit 22 is formed by a CCD or CMOS element which converts an optical image into an electric signal. An analog-to-digital (A/D) converter 23 is used to convert an analog signal output from the imaging unit 22 into a digital signal. The A/D converter 23 is also used to convert an analog signal output from a voice control unit 11 into a digital signal.

A timing generating unit 21 supplies a clock signal and control signals to the imaging unit 22, the voice control unit 11, the A/D converter 23, and a digital-to-analog (D/A) converter 13. The timing generating unit 21 is controlled by a memory control unit 15 and a system control unit 50.

An image processing unit 24 performs predetermined pixel interpolation, resizing processing, such as compression, and color conversion processing on data from the A/D converter 23 or data from the memory control unit 15. The image processing unit 24 further performs predetermined arithmetic processing by using captured (photographed) image data, and the system control unit 50 performs exposure control and focus control based on a result of the arithmetic processing.

Consequently, automatic focus (AF) processing, automatic exposure (AE) processing, and pre-flash emission (EF) processing of a through-the-lens (TTL) type are performed. The image processing unit 24 further executes predetermined arithmetic processing by using the captured image data, and executes the TTL type automatic white balance (AWB) processing.

Output data from the A/D converter 23 is written in a memory 32 via the image processing unit 24 and the memory control unit 15 or directly via the memory control unit 15.

The memory 32 stores file headers when audio data recorded by a microphone 10, photographed still images and moving images, and image files are obtained. The memory 32 has a sufficient memory capacity to store a predetermined numbers of still images, and moving images and sound of predetermined lengths.

A compression/decompression unit 16 is used to compress or decompress image data by adaptive discrete cosine transform (ADCT). More specifically, the compression/decompression unit 16 reads a stored captured image in the memory 32 to compress the captured image when the shutter 101 is operated, and writes processed data in the memory 32.

The compression/decompression 16 reads a compressed image which is read from the recording unit 19 to the memory 32, decompresses the compressed image, and then writes processed data in the memory 32.

The image data written in the memory 32 by the compression/decompression unit 16 is made into a file by a filing unit in the system control unit 50, and recorded in a recording medium 200 via an interface (I/F) 18.

The memory 32 also serves as a memory for displaying images, and image data for display written in the memory 32 is displayed on the image display unit 28 via the D/A converter 13.

An audio signal output from the microphone 10 is converted into a digital signal by the A/D converter 23 via the voice control unit 11 which is formed by an amplifier, or the like, and then stored in the memory 32 by the memory control unit 15.

Meanwhile, the audio data recorded in the recording medium 200 is read into the memory 32, controlled by the voice control unit 11 via the D/A converter 13, and output via a speaker 38.

The system control unit 50 controls the entire digital camera 100. The system memory 52 stores constants, variables, and programs for the operation of the system control unit 50.

A nonvolatile memory 56 is an electrically erasable and recordable memory, and is formed by an electrically erasable and programmable read only memory (EEPROM), for example.

A first shutter switch SW1 (62), a second shutter switch SW2 (64), and an operation unit 70 are used to input various operation commands to the system control unit 50.

A mode changeover switch 60 can change over an operation mode of the system control unit 50 to any of a still image shooting mode, a continuous shooting mode, a moving image mode, and a reproduction mode.

The first shutter switch SW1 turns "ON" halfway through the operation (half press) of the shutter switch 61 to instruct a start of the AF processing, AE processing, AWB processing or EF processing.

The second shutter switch SW2 turns "ON" at completion of the operation (full press) of the shutter switch 61 to instruct a start of a series of imaging processing from reading of a signal from the imaging unit 22 to writing image data in the recording medium 200.

Operation members of the operation unit 70 are assigned functions and work as the function buttons according to a situation appropriately, and a user can use those functions while visually confirming various function icons displayed on the image display unit 28.

The function buttons include an end button, a return button, an image advancing button, a jump button, a narrow-down button, and an attribute change button, for example. For example, when the operation unit 70 is pressed, the various function buttons are displayed on the image display unit 28. The user can execute various settings intuitively by using a menu screen on the image display unit 28 and the operation unit 70.

A power supply switch 72 turns on and off power supply. A power supply control unit 39 is formed by a battery detection circuit, a direct-current-to-direct-current (DC-DC) converter, and a switch circuit configured to switch over blocks to supply power to. The power supply control unit 39 detects the presence or absence of batteries, types of batteries, and remaining charge of batteries.

The power supply control unit 39 controls the DC-DC converter according to a detection result and a command from the system control circuit 50, and supplies necessary voltages to various units, including the recording medium 200, for necessary periods.

The power supply unit 30 includes a primary battery, such as an alkali or lithium (Li) battery, a secondary battery, such as a nickel-cadmium (NiCd), nickel metal hydride (NiMH) or Li battery, and an AC adapter. Connectors 33 and 34 connect the power supply unit 30 to the power supply control unit 39.

A real time clock (RTC) 40 has power supply unit in it independently of the power supply control unit 39, and can maintain the clock operation even when the power supply unit 30 is shut down. The system control unit 50, at the time of startup, controls a timer by using date and time obtained from the RTC 40.

The interface (I/F) 18 is a connection unit to the recording medium 200, such as a memory card or a hard disk, and a connector 35 connects between the recording medium 200 and the interface 18.

A recording medium attachment/detachment detection unit 98 detects if the recording medium 200 is attached to the connector 35.

The recording medium 200 includes the recording unit 19 composed of a semiconductor memory or a magnetic disk, an interface (I/F) 37 with the digital camera 100, and a connector 36 to connect between the recording medium 200 and the digital camera 100.

A communication unit 110 executes communication processing based on various types of standards, such as the recommended standard 232 version C (RS232C), the universal serial bus (USB), the Institute of Electrical and Electronic Engineers (IEEE)1394, P1284, the small computer system interface (SCSI), a modem, a local area network (LAN), and wireless communication.

A connector 112 (an antenna in the case of the wireless communication) connects the digital camera 100 to other devices via the communication unit 110.

Figure 5:
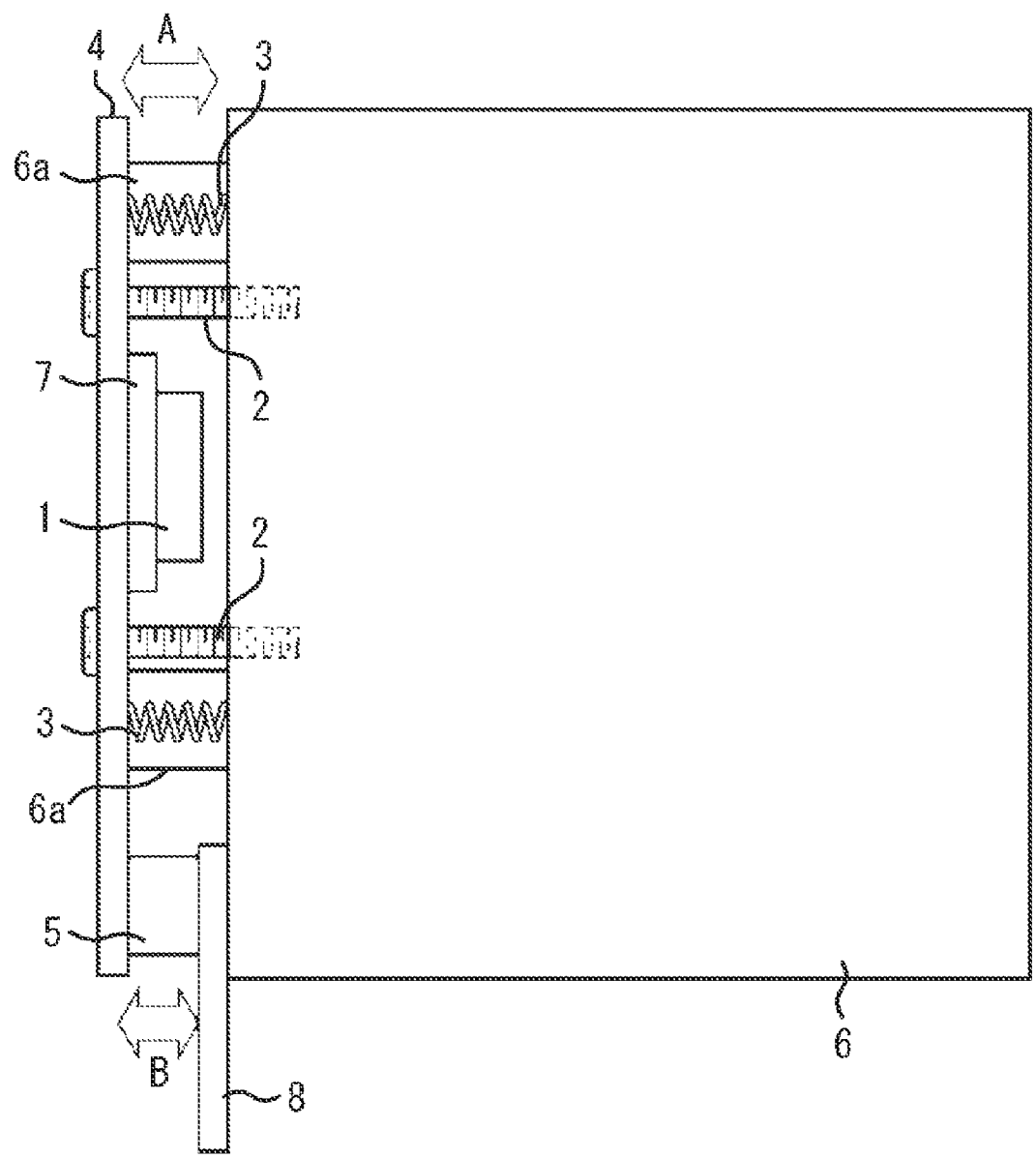
FIG. 5 is a side view of a lens barrel and its vicinity of a digital camera as an imaging apparatus according to a first exemplary embodiment of the present invention.

FIG. 5 is a side view of a lens barrel and its vicinity of a digital camera as an imaging apparatus according to a first exemplary embodiment of the present invention.

A light-receiving surface of an image sensor 1 is arranged at a position where an object image is formed by the photographic lens 103 held by the lens barrel 6. A method of the above arrangement is described below.

The image sensor 1 is soldered to a substrate 7, and an imaging plate 4 is attached to the substrate 7. The imaging plate 4 is made of a metallic material with excellent heat conductivity, such as copper, aluminum, or SUS. The imaging plate 4 is generally fixed to the lens barrel 6 at three or four positions with adjusting screws 2 (fixing members).

Urging springs 3 (elastic members) are sandwiched between the lens barrel 6 and the imaging plate 4 and arranged (attached by pressure contact) in the vicinity of the adjusting screws 2. The urging springs are generally arranged the same number of the adjusting screws 2. The imaging plate 4 is urged by the urging springs 3, and a position or a tilt of an image forming surface is adjusted by tightening or loosening the adjusting screws 2.

Therefore, the urging springs 3 serve as the elastic members arranged between the lens barrel 6 and the imaging plate 4. The adjusting screws 2 function as the fixing members to fix the imaging plate 4 to the lens barrel 6 while elastically deforming the elastic urging springs 3.

In other words, the imaging plate 4 is adjustably supported on the lens barrel 6. Thus, variations in the optical performance of individual lens barrels are absorbed, and a desired optical performance can be achieved.

A heat transfer plate 8 is fixed to the lens barrel 6. The heat transfer plate 8 dissipates heat of the image sensor 1. The heat transfer plate 8 is made of a material with excellent heat conductivity, such as copper or aluminum. The heat transfer plate 8 helps to increase strength of the lens barrel 6.

An assembling procedure and a method for providing a thermal coupling of the image sensor 1 to the heat transfer plate 8 will be described below.

An elastically deformable heat-conductive sheet 5 is disposed on the heat transfer plate 8. For the heat-conductive sheet 5, for example, a silicon sheet or an acrylic sheet may be used. The heat-conductive sheet 5 is sandwiched by its elasticity between the imaging plate 4 and the heat transfer plate 8.

After the heat-conductive sheet 5 is attached, the urging springs 3 are put into urging-spring mounting parts 6a of the lens barrel 6. Then, the imaging unit 22 in which the image sensor 1, the substrate 7, and the imaging plate 4 are integrated is mounted to the lens barrel 6 and fixed with adjusting screws 2.

By adopting the structure described above, the heat transmits from the image sensor 1 to the imaging plate 4 and then to the heat transfer plate 8. Finally, the heat transmits through the heat transfer plate 8 and radiates from an outer cover or the tripod screw 20 to the atmosphere.

Therefore, the image sensor 1 can be prevented from rising in temperature by improving radiation efficiency without increasing a size of the digital camera 100.

Even if variations in the position of the imaging unit 22 occur due to the optical adjustment by changing tightening strength of the adjusting screws 2, the imaging plate 4 can be attached to the heat transfer plate 8 via the heat-conductive sheet 5 by absorbing the variations by the elasticity of the heat conductive sheet 5.

Though a stress develops (in the B direction) by the elasticity of the heat-conductive sheet 5, according to the structure in the present exemplary embodiment, because stress occurs in the same direction as the stress direction of the urging springs 3 (in the A direction), the imaging unit 22 can be held in a desirable position without detracting from the urging effect of the urging springs 3.

In other words, the direction of the urging force (elastic force) applied to the imaging plate 4 by the urging springs 32 when the imaging plate 4 is fixed to the lens barrel 6 coincides with the direction of the elastic force applied to the imaging plate 4 by the heat-conductive sheet 5, and therefore the elastic force of the heat-conductive sheet 5 does not hamper the urging action by the urging springs 3.

Figure 6:
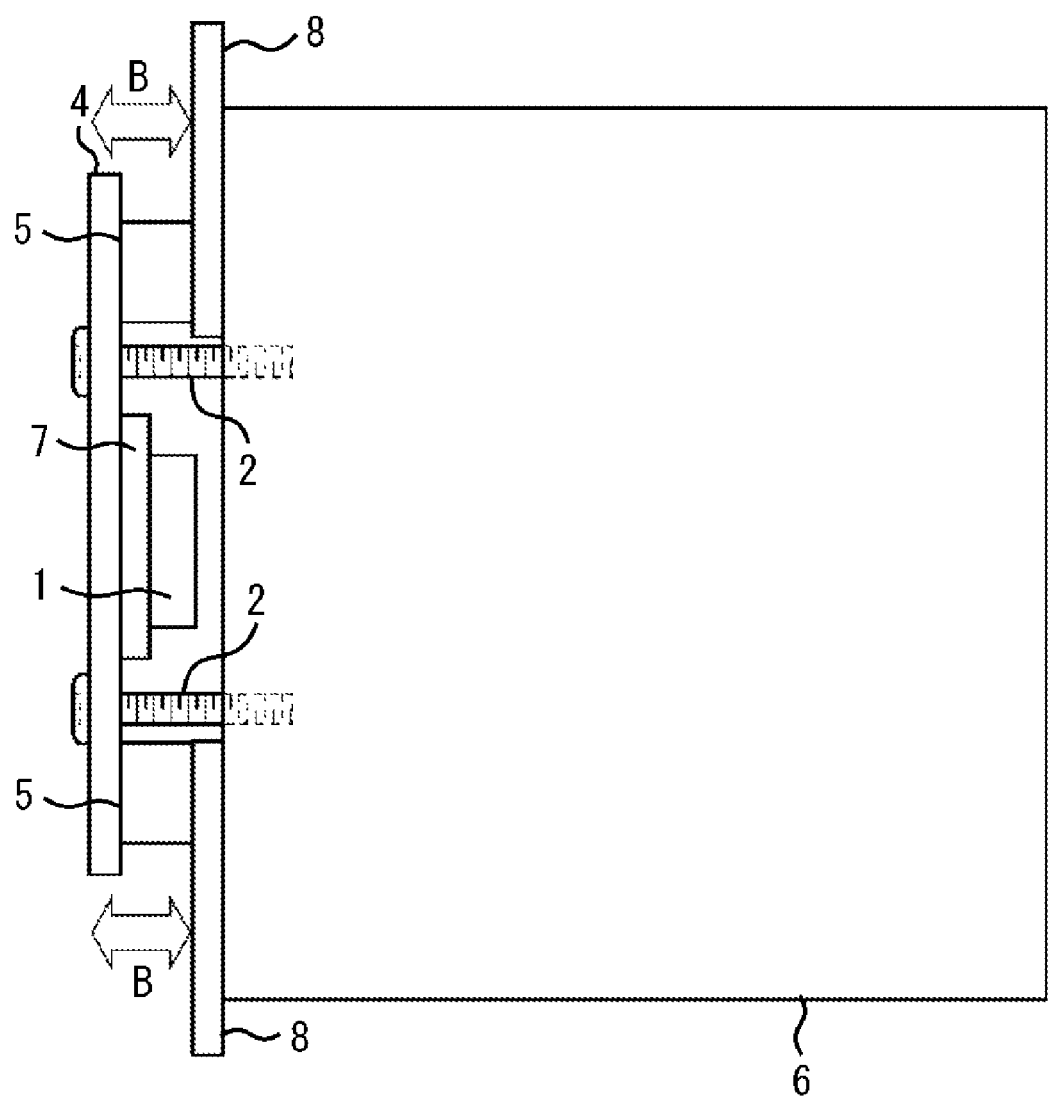
FIG. 6 is a side view of a lens barrel and its vicinity of a digital camera as an imaging apparatus according to a second exemplary embodiment of the present invention.

FIG. 6 is a side view of a lens barrel and its vicinity of a digital camera as an imaging apparatus according to a second exemplary embodiment of the present invention.

As illustrated in FIG. 6, by arranging heat-conductive sheets 5 near all of the adjusting screws 2, the imaging unit 22 can be held by the stress from the heat-conductive sheet 5 if a number of the urging springs 3 is reduced or the urging springs 3 are completely removed, so that a number of parts can be reduced.

Figure 7:
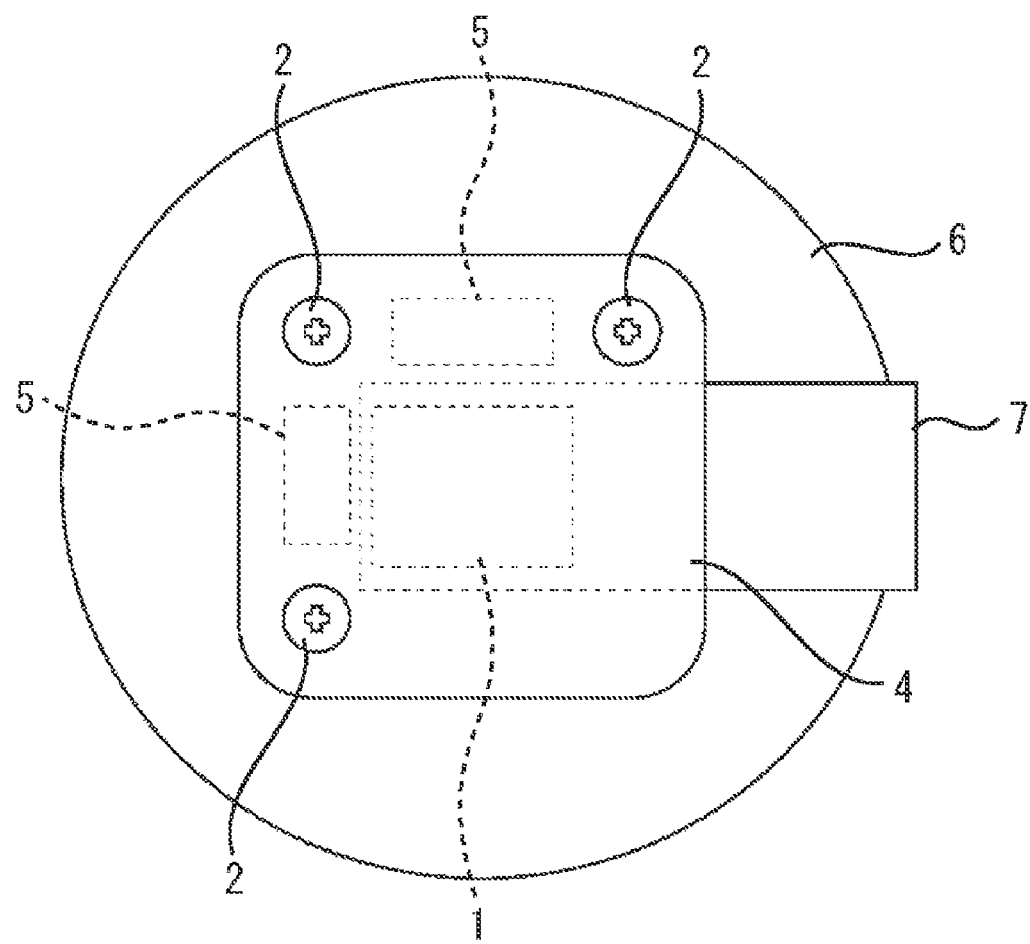
FIG. 7 is a rear view of a lens barrel and its vicinity of a digital camera as an imaging apparatus according to a third exemplary embodiment of the present invention.
Figure 8:
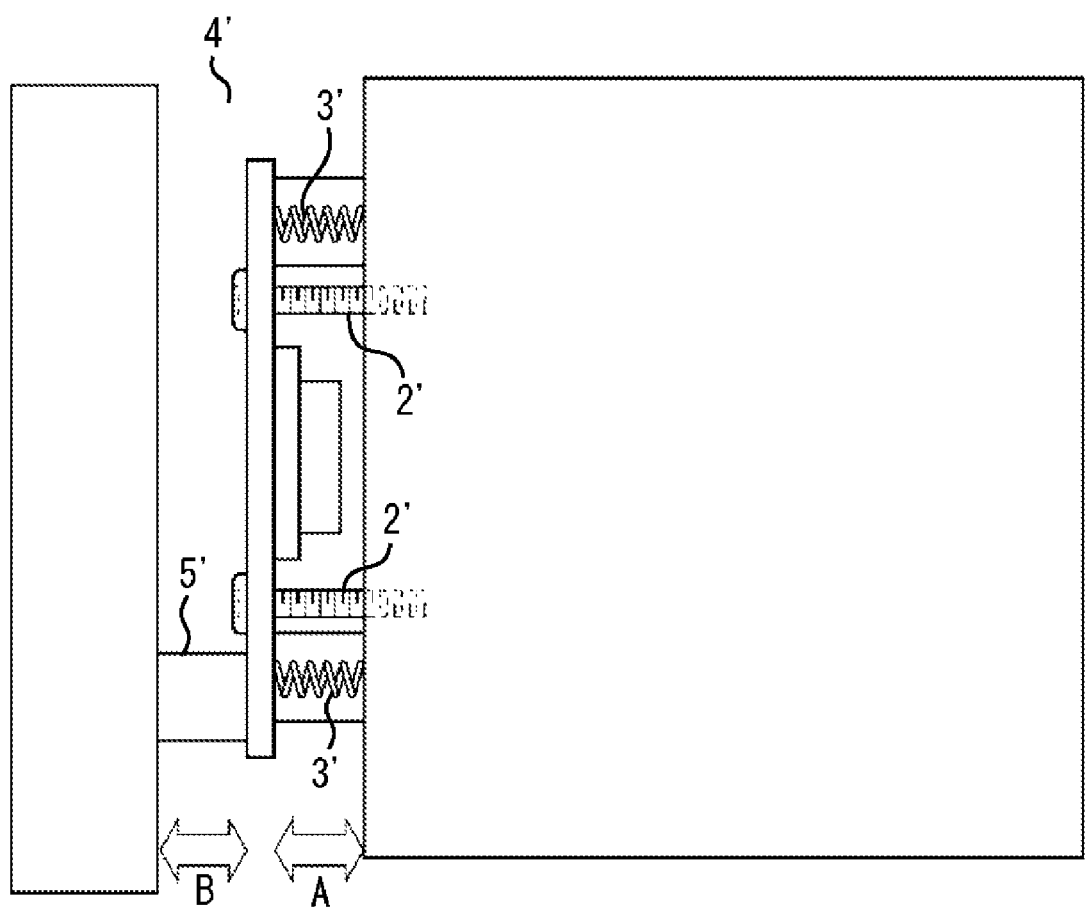
FIG. 8 is a side view of a lens barrel and its vicinity of a digital camera as an imaging apparatus as a conventional example.

FIG. 7 is a rear view of a lens barrel 6 and its vicinity of a digital camera as an imaging apparatus according to a third exemplary embodiment of the present invention.

As illustrated in FIG. 7, if the heat-conductive sheet 5 is arranged on a line connecting centers of two adjusting screws 2, even if the digital camera does not have the urging springs 3, the stress balance of the heat-conductive sheet 5 can be maintained, so that the optical adjustment can be properly performed.

According to the imaging apparatus of the exemplary embodiments of the present invention, high quality image data showing less noise can be formed even in high-speed continuous shooting and long-time exposure imaging while preventing a temperature rise in the image sensor and not detracting from the performance of the tilt adjusting mechanism.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-233542 filed Sep. 11, 2008, which is hereby incorporated by reference herein in its entirety.

What is claimed is:

1. An imaging apparatus comprising:
a lens barrel;
an image sensor;
an imaging plate configured to fix the image sensor thereto;
an elastic member disposed between the lens barrel and the imaging plate;
a fixing member configured to fix the imaging plate to the lens barrel so that the elastic member applies an elastic force to the imaging plate;
a heat transfer plate which transfers heat from the imaging plate; and
a heat-conductive sheet which is elastically deformable and attached between the imaging plate and the heat transfer plate,
wherein when the imaging plate is fixed to the lens barrel, the heat-conductive sheet is sandwiched between the imaging plate and the heat transfer plate, such that a direction of the elastic force applied to the imaging plate by the elastic member coincides with a direction of an elastic force applied to the imaging plate by the heat-conductive sheet.

2. An imaging apparatus comprising:
a lens barrel;
an image sensor;
an imaging plate configured to fix the image sensor thereto;
a fixing member configured to fix the imaging plate to the lens barrel;
a heat transfer plate which transfers heat from the imaging plate; and
an heat-conductive sheet which is elastically deformable and attached between the imaging plate and the heat transfer plate,
wherein the heat-conductive sheet applies an elastic force to the imaging plate, and
wherein the heat-conductive sheet and the heat transfer plate are sandwiched between the lens barrel and the imaging plate, and the fixing member fixes the imaging plate to the lens barrel so that the heat-conductive sheet applies the elastic force to the imaging plate.

3. The imaging apparatus according to claim 2, wherein the fixing member is an adjusting screw for fixing the imaging plate to the lens barrel and the heat-conductive sheet is arranged on a line connecting centers of two adjusting screws.

* * * * *